(12) United States Patent
Sandhu et al.

(10) Patent No.: US 10,392,062 B2
(45) Date of Patent: Aug. 27, 2019

(54) THREE PIECE MODULAR AUTOMOTIVE INSTRUMENT PANEL

(71) Applicant: NYX, Inc., Livonia, MI (US)

(72) Inventors: Chain Sandhu, Livonia, MI (US); Lev Lilov, Livonia, MI (US); Jeffrey Michael Bisson, Amherstburg (CA)

(*) Notice: Subject to any disclaimer, the term of this patent is extended or adjusted under 35 U.S.C. 154(b) by 343 days.

(21) Appl. No.: 14/189,186

(22) Filed: Feb. 25, 2014

(65) Prior Publication Data

US 2014/0239663 A1 Aug. 28, 2014

Related U.S. Application Data

(60) Provisional application No. 61/768,698, filed on Feb. 25, 2013.

(51) Int. Cl.
*B62D 65/02* (2006.01)
*B60K 37/00* (2006.01)
*B60K 37/02* (2006.01)

(52) U.S. Cl.
CPC .............. *B62D 65/02* (2013.01); *B60K 37/00* (2013.01); *B60K 37/02* (2013.01); *B60K 2370/81* (2019.05); *B60K 2370/828* (2019.05); *Y10T 29/49826* (2015.01)

(58) Field of Classification Search
CPC ..... B62D 25/14; B62D 25/145; B62D 25/147
USPC ......................................................... 296/70
See application file for complete search history.

(56) References Cited

U.S. PATENT DOCUMENTS

| 5,456,002 | A | * | 10/1995 | Barnhart | B62D 65/14 29/430 |
| 5,627,409 | A | * | 5/1997 | Nishitani | B60K 37/02 307/10.1 |
| 5,823,602 | A | * | 10/1998 | Kelman et al. | 296/70 |
| 5,857,726 | A | * | 1/1999 | Yokoyama et al. | 296/70 |
| 6,073,987 | A | | 6/2000 | Lindberg et al. | |
| 6,234,569 | B1 | * | 5/2001 | Derleth et al. | 296/208 |
| 6,371,551 | B1 | * | 4/2002 | Hedderly | 296/192 |
| 6,488,330 | B2 | * | 12/2002 | Hedderly | 296/192 |
| 6,709,041 | B1 | * | 3/2004 | Hotary | B60K 37/00 296/37.12 |
| 2001/0030435 | A1 | * | 10/2001 | Burns | B60K 37/00 296/24.3 |
| 2002/0017410 | A1 | | 2/2002 | Larsson et al. | |

(Continued)

FOREIGN PATENT DOCUMENTS

CN 200977866 Y * 11/2007
CN 102935807 A * 2/2013

(Continued)

OTHER PUBLICATIONS

2002 Jeep Liberty—Instrument Panel and Radios and Consoles. Mopar. Retrieved from http://www.mopar.com/jeep/liberty/2002/shop/692/128/3762/ Feb. 11, 2014.

*Primary Examiner* — Hilary L Gutman
(74) *Attorney, Agent, or Firm* — Carlson, Gaskey & Olds, P.C.

(57) ABSTRACT

An example instrument panel includes a plurality of modules and first and second section. Each section includes a module-receiving area. The plurality of modules are interchangeable. The module-receiving areas can each receive at least one of the plurality of modules. An alternate instrument panel and a method of assembling also include interchangeable modules.

1 Claim, 9 Drawing Sheets

(56) References Cited

U.S. PATENT DOCUMENTS

2002/0017798 A1\* 2/2002 Shikata et al. .................. 296/70
2007/0271758 A1\* 11/2007 Lohman ................ B62D 65/14
29/428

FOREIGN PATENT DOCUMENTS

| EP | 1657105 | | | 5/2006 | |
|----|---------|---|---|--------|---|
| JP | 11240357 | A | \* | 9/1999 | |
| JP | 2000190755 | A | \* | 7/2000 | |
| JP | 2000326722 | A | \* | 11/2000 | |
| JP | 2006248260 | A | \* | 9/2006 | |
| JP | 2015081038 | A | \* | 4/2015 | |
| WO | 0112458 | | | 2/2001 | |
| WO | WO 2008139970 A1 | | \* | 11/2008 | ............. B60R 11/02 |

\* cited by examiner

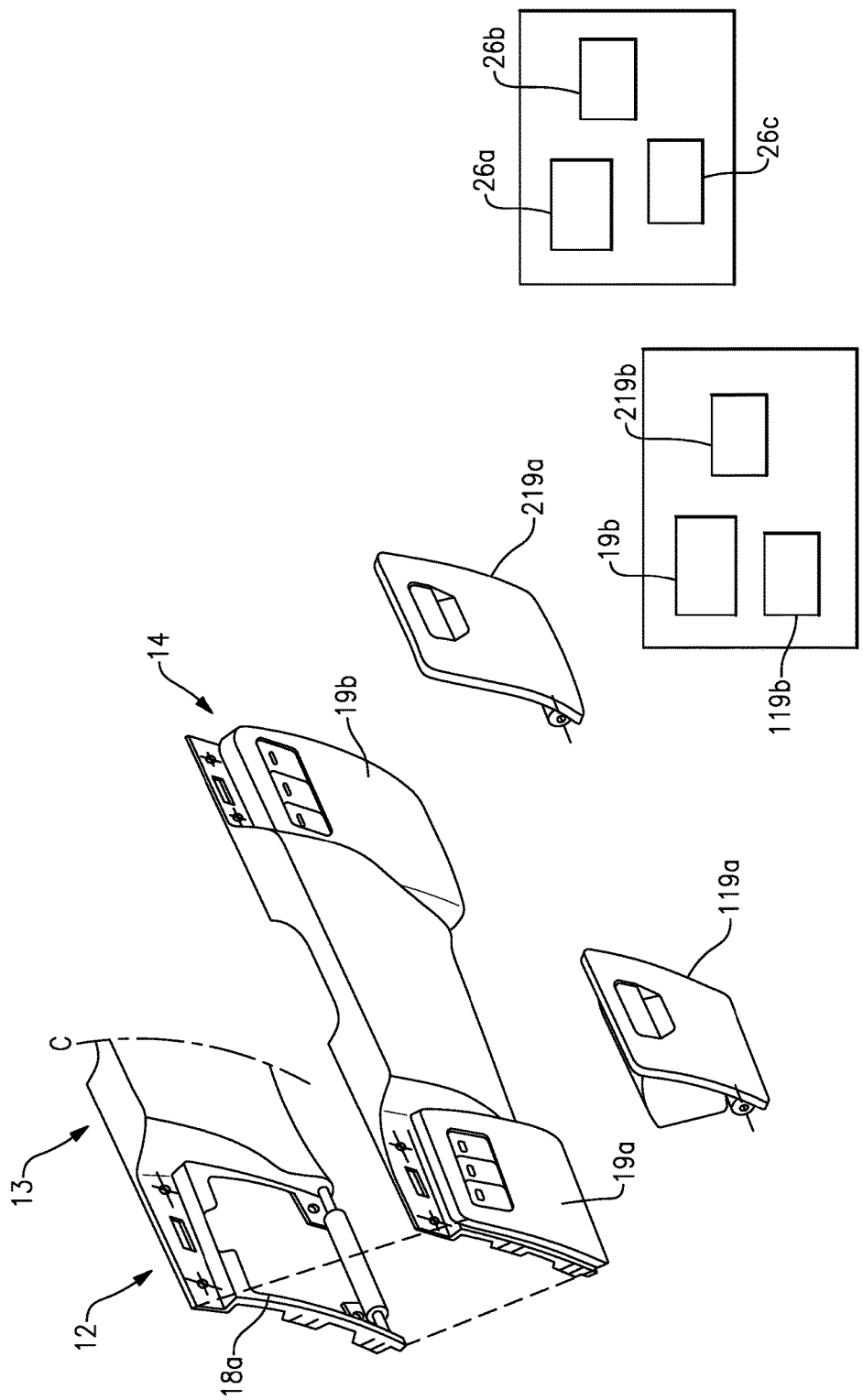

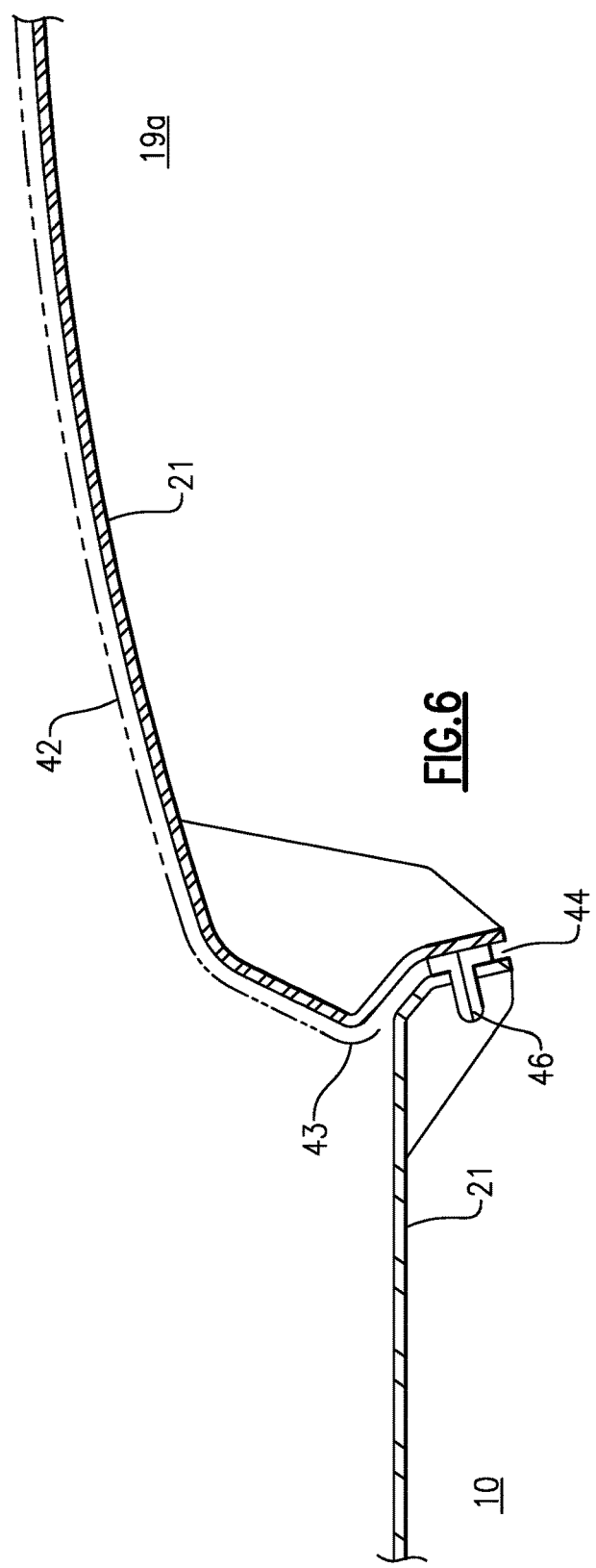

THREE PIECE MODULAR AUTOMOTIVE INSTRUMENT PANEL

CROSS-REFERENCE TO RELATED APPLICATIONS

This application claims priority to U.S. Provisional Application No. 61/768,698, filed on Feb. 25, 2013.

BACKGROUND

This disclosure relates to a modular instrument panel for vehicles. An instrument panel in a vehicle can include features for vehicle occupants, such as gauges, entertainment or climate controls, compartments, etc. Certain features may be particular to a driver side of the vehicle, and certain other features can be particular to a passenger side of a vehicle.

SUMMARY

An instrument panel according to an example of the present disclosure includes a plurality of modules and first and second sections. Each section includes at least one module-receiving area configured to interchangeably receive at least one of the plurality of modules.

In a further embodiment of any of the foregoing embodiments, the first section corresponds to a first occupant section of a vehicle and the second section corresponds to a second occupant section of a vehicle.

In a further embodiment of any of the foregoing embodiments, the instrument panel is symmetrical about a centerline between the first and second sections.

A further embodiment of any of the foregoing embodiments includes a center section arranged between the first and second sections.

In a further embodiment of any of the foregoing embodiments, the center section is configured to interchangeably receive a first module of the plurality of modules.

In a further embodiment of any of the foregoing embodiments, the first module includes at least one of a touch screen, a radio or entertainment system, and a controller for a heat, ventilation, and air conditioning system.

In a further embodiment of any of the foregoing embodiments, the first and second sections are configured to receive the at least one module on a front side of the instrument panel, and further comprising at least one mounting flange on a back side of the instrument panel.

In a further embodiment of any of the foregoing embodiments, the at least one mounting flange includes one or more fastener-receiving locations.

In a further embodiment of any of the foregoing embodiments, the first and second sections each include one or more fastener-receiving locations.

A further embodiment of any of the foregoing embodiments comprises at least one vent in each of the first and second sections operatively connected to a heating, ventilation, and air conditioning system.

In a further embodiment of any of the foregoing embodiments, a topper pad covers at least a portion of one of the first and second sections and plurality of modules.

In a further embodiment of any of the foregoing embodiments, the topper pad covers at least part of the first and second modules, and further comprising a wrap covering the topper pad.

In a further embodiment of any of the foregoing embodiments, there is a gap between at least one of the first and second sections and the plurality of modules when the plurality of modules are in an installed position.

A further embodiment of any of the foregoing embodiments comprises first and second pillars positioned on the periphery of the first and second sections.

An instrument panel according to an example of the present disclosure includes first and second groups of modules and first and second sections. The first and second sections each include a module-receiving portion configured to interchangeably receive a module from the first and second groups of modules, respectively.

In a further embodiment of any of the foregoing embodiments, the first group of modules is configured for a first occupant section of a vehicle, and the second group of modules is configured second occupant section of a vehicle.

A further embodiment of any of the foregoing embodiments further comprises a center section arranged between the first and second groups of modules and configured to interchangeably receive a module from a third group of modules.

A method of assembling an instrument panel according to an example of the present disclosure includes the steps of positioning a first section of an instrument panel with respect to an axis, installing a second section of the instrument panel into the first section of the instrument panel and removably installing at least one module into at least one of the first and second sections of the instrument panel.

In a further embodiment of any of the foregoing embodiments, the first installing step includes rotating the first section of the instrument panel to align a centerline of the first portion of the instrument panel with the axis.

In a further embodiment of any of the foregoing embodiments, the positioning step includes positioning the first section of the instrument panel at an angle with respect to the axis, and wherein the angle is about 45 degrees or greater.

In a further embodiment of any of the foregoing embodiments, the first installing step comprises lowering the first portion of the instrument panel.

In a further embodiment of any of the foregoing embodiments, the second installing step comprises raising the second portion of the instrument panel.

A further embodiment of any of the foregoing embodiments further comprises the step of selecting the module from one of at least one group of modules.

In a further embodiment of any of the foregoing embodiments, a first group of modules is configured for a first occupant section, and a second group of modules is configured for a second occupant section.

BRIEF DESCRIPTION OF THE DRAWINGS

The various features and advantages of the present disclosure will become apparent to those skilled in the art from the following detailed description. The drawings that accompany the detailed description can be briefly described as follows.

FIG. 4 schematically illustrates a top-down view of the installation of the example modular vehicle instrument panel of FIG. 1 into a vehicle.

FIG. 5 schematically illustrates installation of example groups of modules into the modular vehicle instrument panel of FIG. 1.

FIG. 6 schematically illustrates a close-up cutaway view of an example module installed into the vehicle instrument panel of FIG. 1.

DETAILED DESCRIPTION

Figure 1:
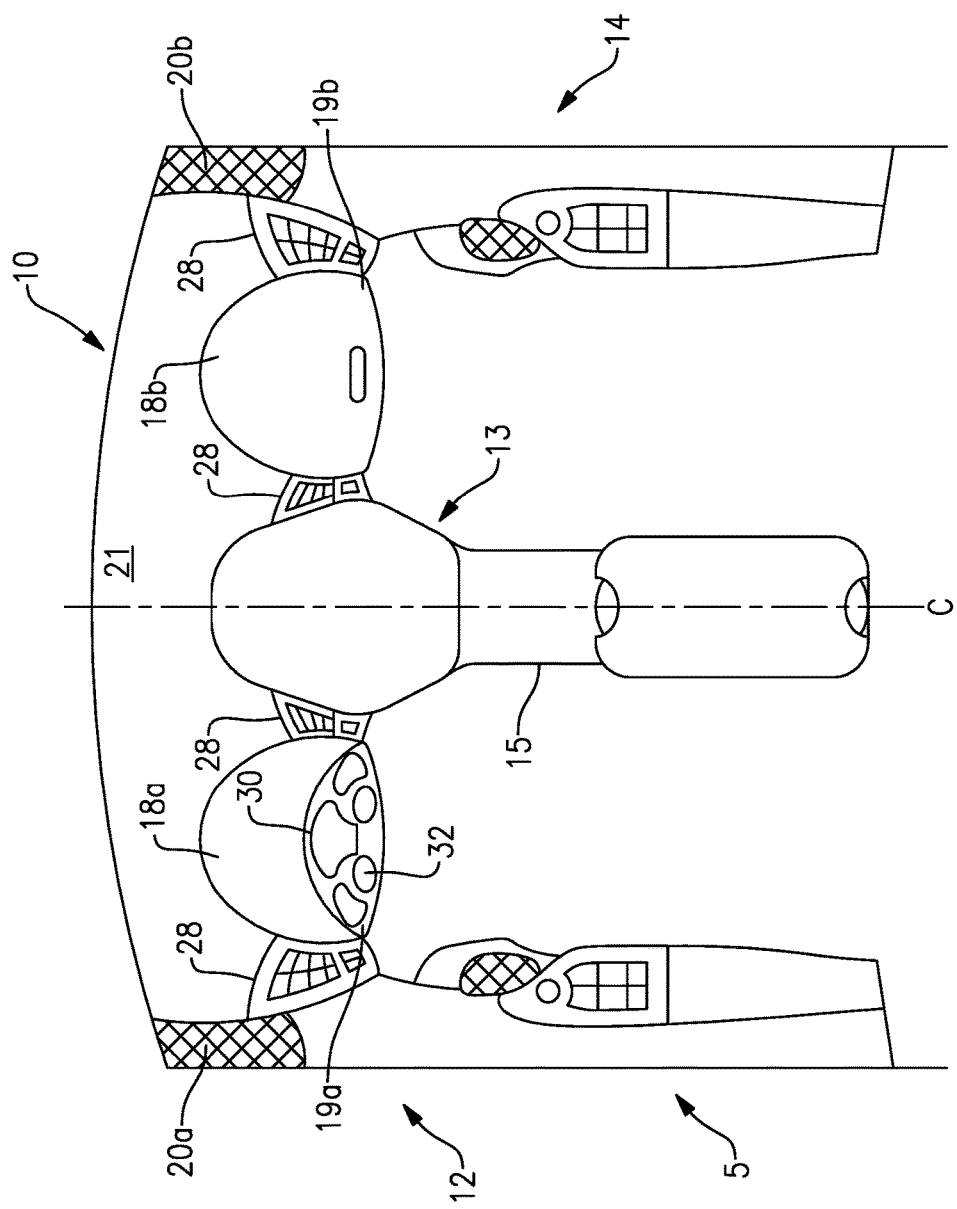
FIG. 1 schematically illustrates a top-down view of an example modular vehicle instrument panel.
Figure 2:
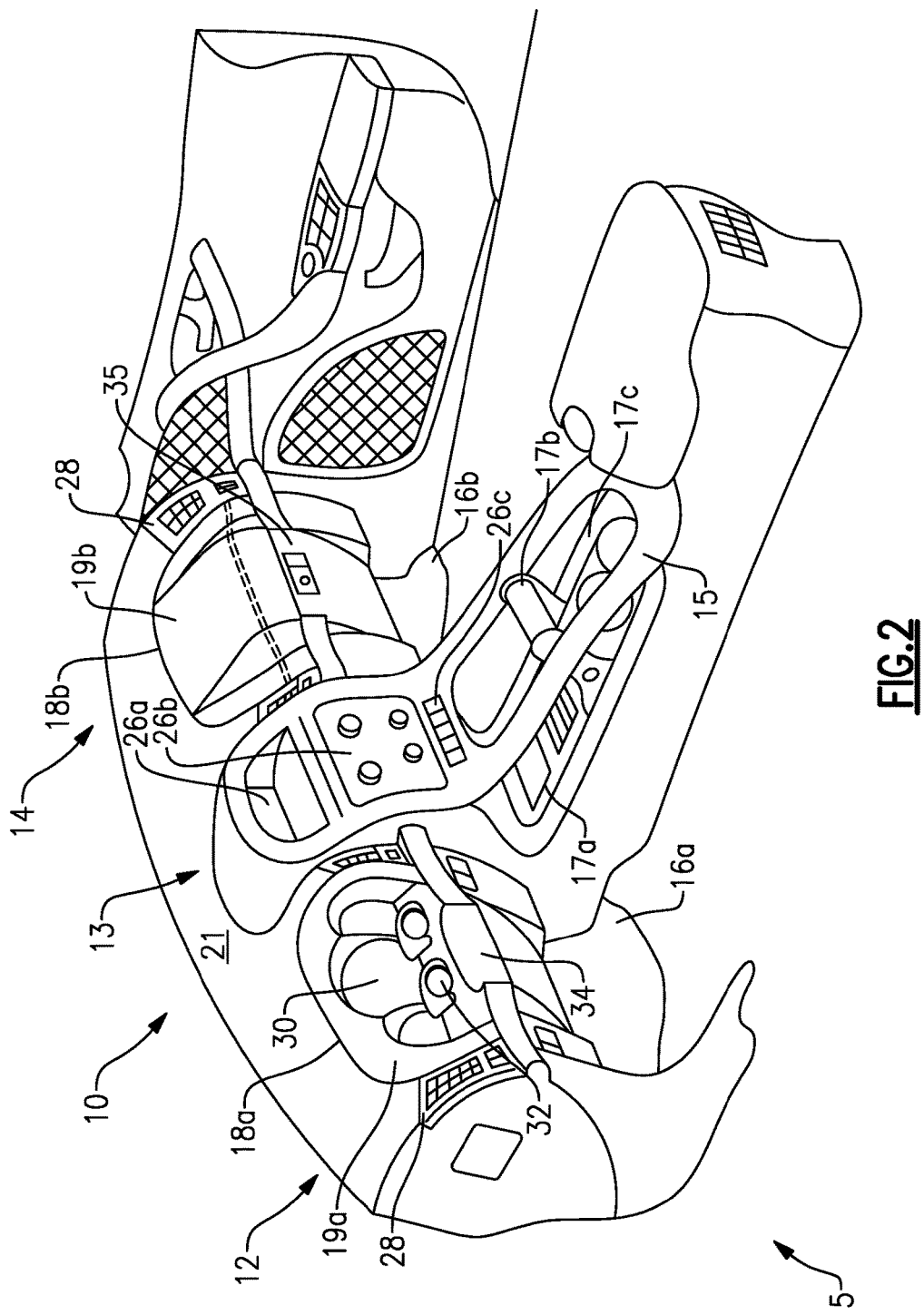
FIG. 2 schematically illustrates a perspective view of the example modular vehicle instrument panel of FIG. 1.

FIGS. 1-2 schematically illustrate an example modular vehicle instrument panel 10. As will be described, the modular instrument panel 10 has first and second opposed sections 12, 14 that are configured with interchangeable instrument panel modules, shown at 19a, 19b. For example, the interchangeable modules 19a, 19b allow each of the first and second sections 12, 14 to be configured, respectively, either as a driver or passenger sections. Therefore, the modular instrument panel 10 can be used as a common design across different geographical locations where the driver and passenger sides of a vehicle vary. Moreover, the modules 19a, 19b can be selected from a group of interchangeable modules. For example, the group can include a plurality of different, interchangeable driver modules and a plurality of different, interchangeable passenger modules, to provide a variety of different options, appearances, or functionalities, for example. The instrument panel 10 can also be personalized with respect to materials, colors, storage options, and electronic/audio options.

The instrument panel 10 in the illustrated example may comprise three key sections, including the interchangeable modules 19a, 19b and a center section, or "center stack," 13. Each of the interchangeable modules 19a, 19b is mounted on a common cross-vehicle beam 22 (FIG. 2). A centerline C of the instrument panel 10 runs through the center of the center section 13. In one example, the interchangeable modules 19a, 19b may include different materials, instrumentation, colors, and storage options. In another example, the interchangeable modules 19a, 19b can include some of the same materials, instrumentation, colors, or storage options. For instance, the interchangeable modules 19a, 19b may be symmetrical with respect to one another about the centerline C to permit the module interchangeability. That is, variations are driven from the centerline C outboard with respect to the vehicle. Additionally, module-receiving areas 18a, 18b may include locating features 29 (FIG. 3) and wiring for simple installation of other sections.

The interchangeable modules 19a, 19b can include common parts, such as topper pads or appliques 21 for customizing the style of the instrument panel 10. The topper pads or appliques 21 may cover all or any parts of any of the instrument panel 10. This may reduce the costs of manufacturing the instrument panel 10. Manufacturers can employ a global platform for manufacture of the interchangeable modules 19a, 19b and easily produce many configurations of each part in order to offer more customization choices for the customer. Validation and engineering changes are simplified with this manufacturing method. Additionally, it allows the customer to vary the materials, features included, and styling of their vehicles after purchasing the vehicle.

The center section 13 is arranged on top of a console 15. In one example, the console 15 is a universal console suitable for many types of vehicles and instrument panels 10. The console 15 may include features such as contacts for a heat, ventilation, and air conditioning (HVAC) system 17a, a shifter 17b, and an emergency break 17c, amongst other features.

The center section 13 may include one or more modules. In the example shown, the center section 13 includes three modules 26c, 26b, 26c, however, the center section 13 may alternatively include more or less modules. The modules may be, for instance, a touch screen 26c, a radio or entertainment system 26b, and controls for the HVAC system 26c. In another example, different modules may be used. The instrument panel 10 may include other features such as air bag assemblies, ambient lighting, or specific switch modules (such as exterior lighting, wiper controls, trunk release, etc.) in any of the interchangeable modules 19a, 19b or center section 13.

The module-receiving areas 18a, 18b, respectively, are configured to receive either of the interchangeable modules 19a, 19b. In this regard, the module-receiving areas 18a, 18b are symmetric relative to centerline C.

FIGS. 1-2 show the instrument panel 10, including the example modules 19a, 19b, installed in the module-receiving areas 18a, 18b. In the example shown, each of the sections 12, 14 includes one module-receiving area 18a, 18b, however, in another example, the sections 12, 14 may include more than one module receiving area 18a, 18b.

Vents 28 may be located between the module-receiving areas 18a, 18b and the A-pillars 20a, 20b, respectively. In another example, additional vents 28 may be located in other areas of the instrument panel 10. The module 19a may include features such as gauges 30, indicators 32, and a steering column mount 34. Other features may be included as well. The module 19b may include one or more compartments 35. The modules 19a, 19b as well as the modules 26c, 26b, 26c can be removed and interchanged with one another or with other installable modules easily and without any unique tooling. That is, the modules 19a, 19b and 26c, 26b, 26c are configured such that they can be received in any of the module-receiving areas 18a, 18b and also in the center section 13. Any of the modules 19a, 19b, 26c, 26b, 26c can be covered by a topper pad or applique 21.

Figure 3A:
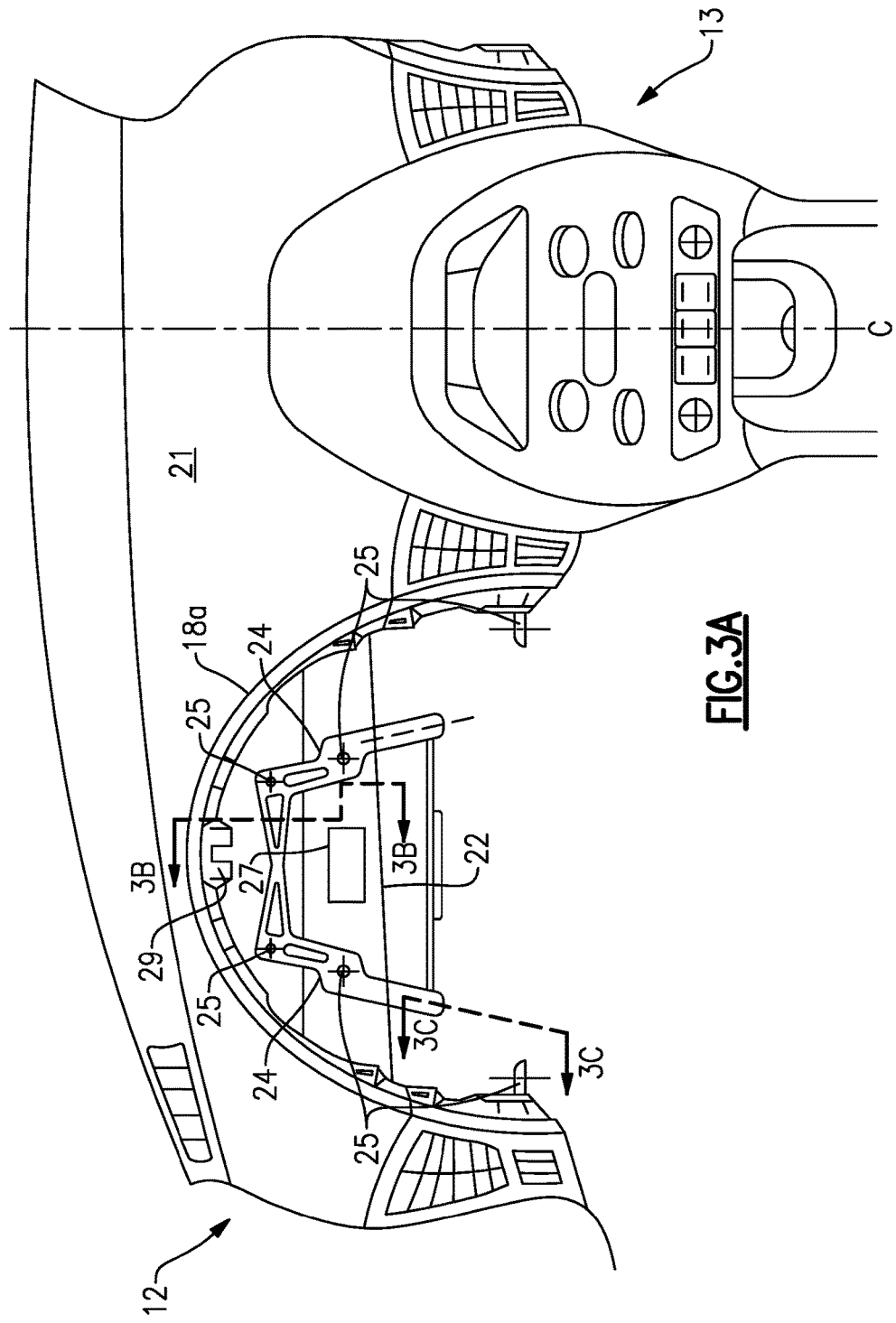
FIG. 3A schematically illustrates a cutaway view of a portion of the modular vehicle instrument panel of FIG. 1.
Figure 3B:
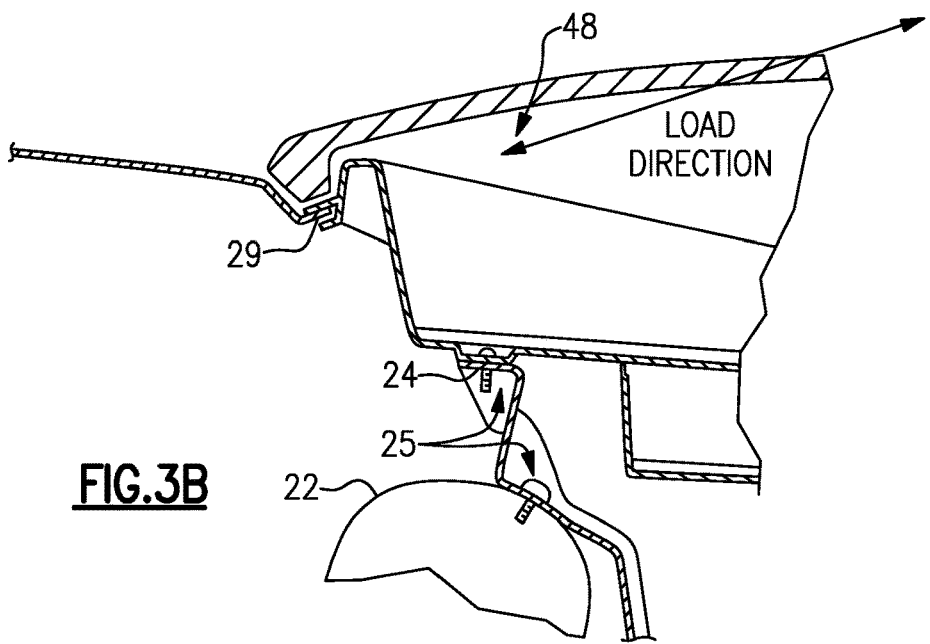
FIGS. 3B and 3C illustrate, respectively, sectioned views of the modular vehicle instrument panel according to the section lines shown in FIG. 3A.
Figure 3C:
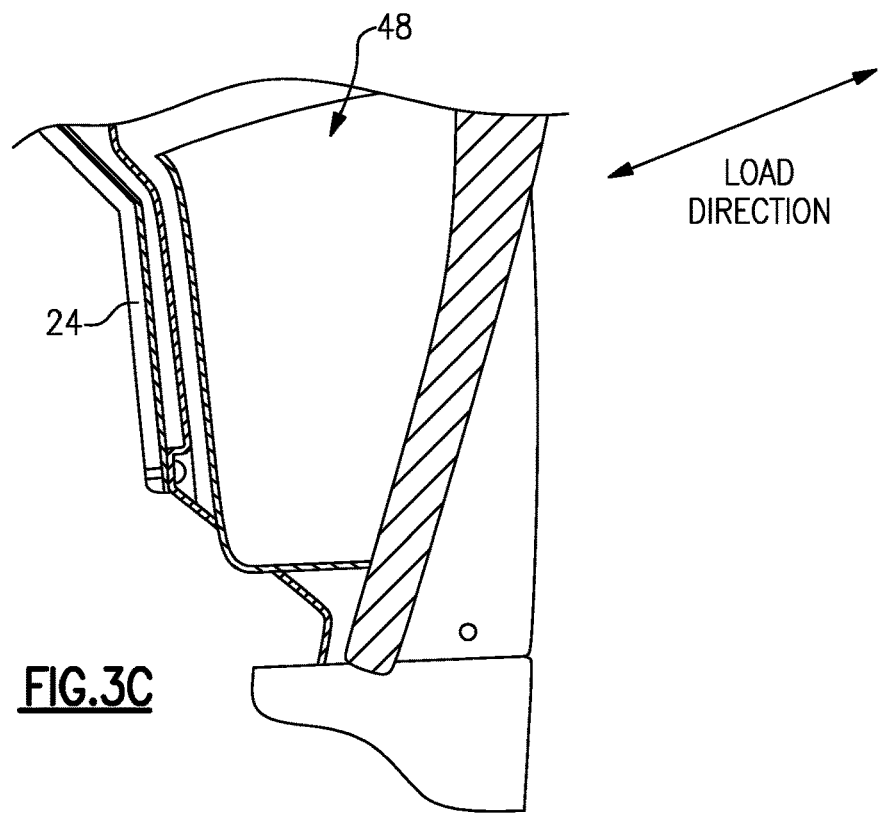
Figure 4A:
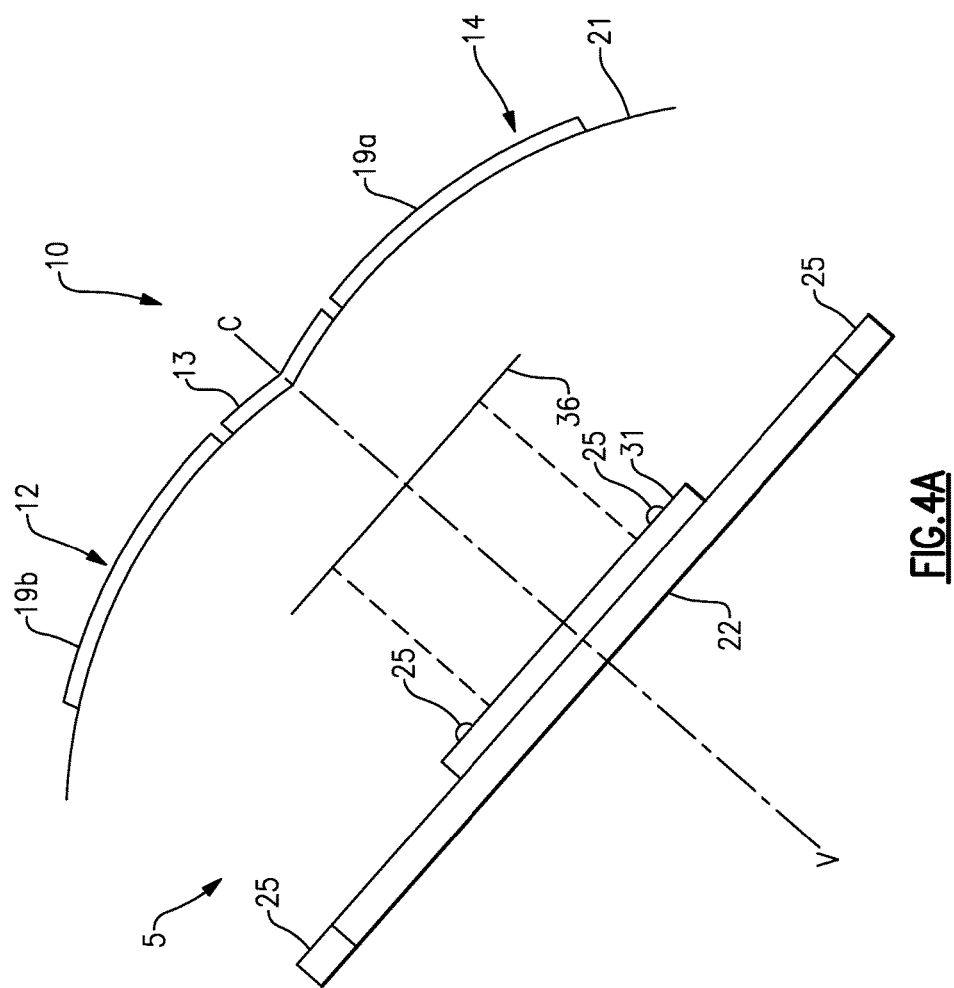
FIG. 4A schematically illustrates positioning the instrument panel of FIG. 4 with respect to an axis of the vehicle.
Figure 4B:
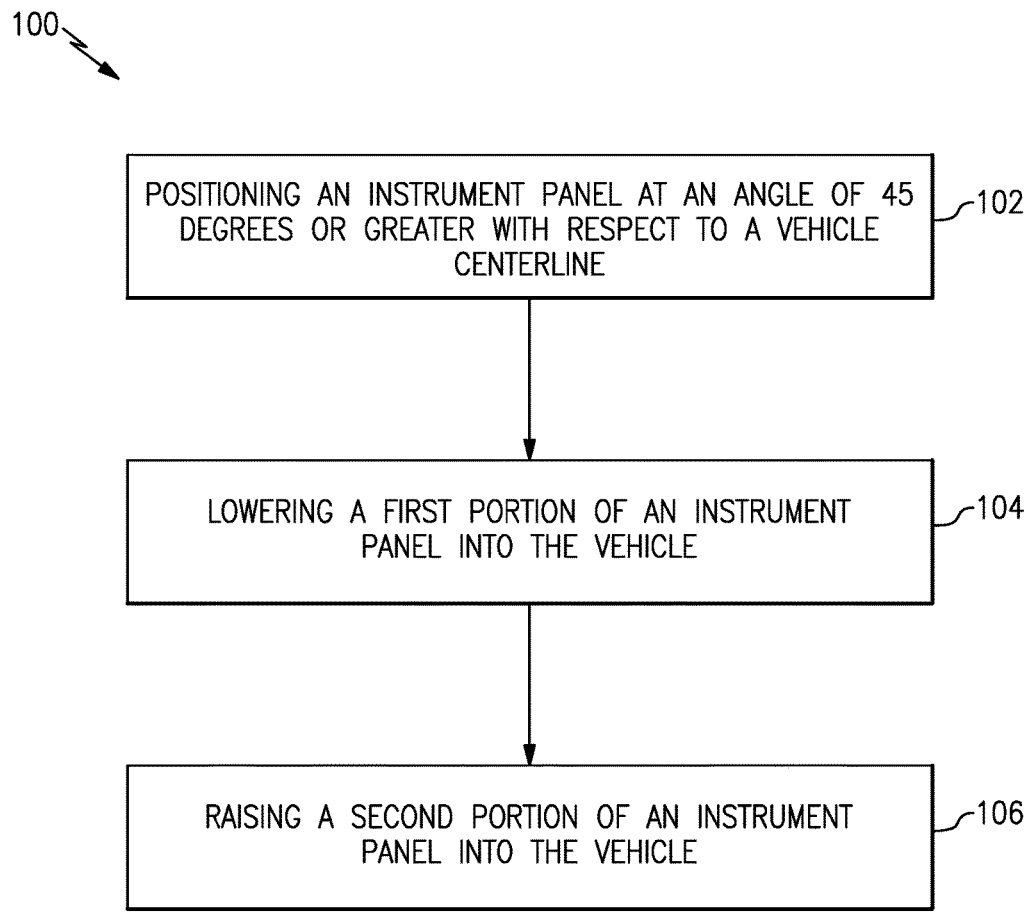
FIG. 4B shows a flowchart of a method of installing an instrument panel in a vehicle.
Figure 4C:
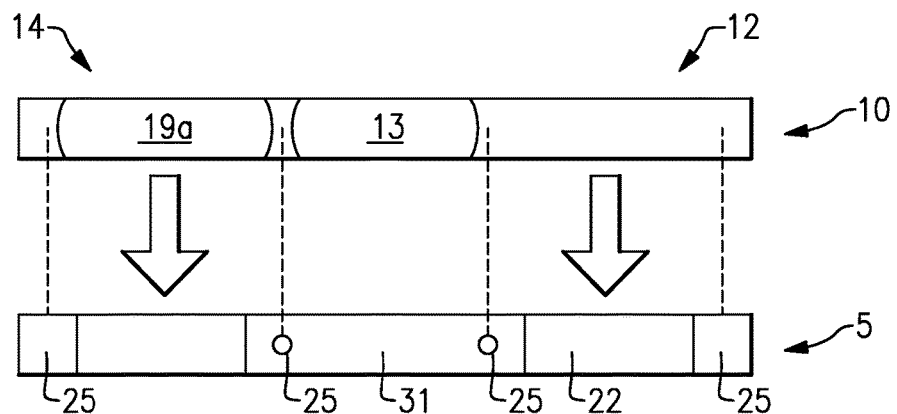
FIG. 4C schematically illustrates lowering a first portion of the instrument panel of FIG. 4 into the vehicle.
Figure 4D:
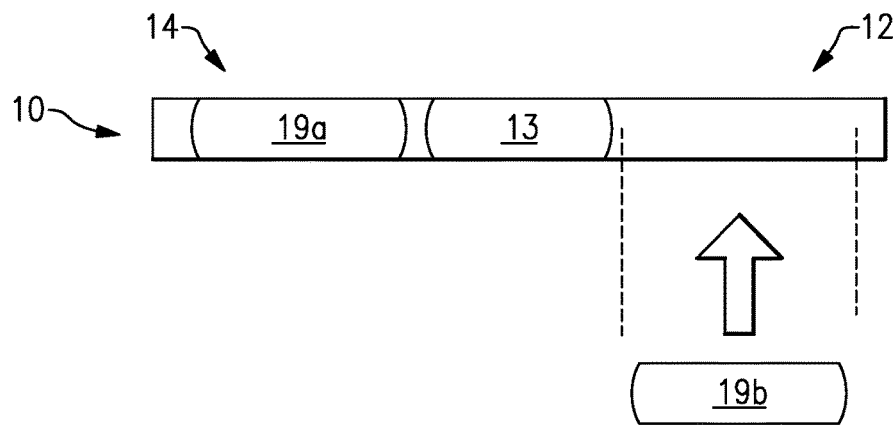
FIG. 4D schematically illustrates installing a second portion of the instrument panel into the first portion by raising the second portion.

FIG. 3A shows a cutaway view of a portion of the first section 12, without a module installed. The cross-vehicle beam 22 runs behind the module-receiving areas 18a, 18b, the interchangeable modules 19a, 19b and the center section 13, perpendicular to the centerline C. One or more mounting brackets 24 attach the module-receiving areas 18a, 18b to the cross-vehicle beam 22 via one or more fasteners. Fastener-receiving locations 25 may be located on mounting flange 31 (FIG. 4), on the mounting brackets 24, and/or at the periphery of the module-receiving portions 18a, 18b. Additional fastener-receiving locations 25 may be located throughout the module-receiving sections 18a, 18b or other parts of the instrument panel 10. FIGS. 3B and 3C show sectioned views according to the section lines shown in FIG. 3A. In the sectioned views, a glovebox bin 48 is shown (in part) installed on the bracket 24. An HVAC duct 27 is located above the cross-vehicle beam 22 behind the module-receiving area 18a. In one example, a corresponding HVAC duct (not shown) is positioned symmetrically to the HVAC duct 27 positioning about the centerline C and behind the module-receiving area 18b to promote interchangeability of the module-receiving areas 18a, 18b.

FIG. 4 illustrates a top-down view of the installation of the instrument panel into a vehicle 5. The installation is conducted according to the method 100 shown in FIG. 4B. In step 102, the instrument panel is positioned with respect to the vehicle centerline V (as shown in FIG. 4A). The instrument panel 10 is installed into the vehicle 5 such that the centerline C of the instrument panel 10 matches up with the centerline V of the vehicle 5. In one example, the instrument panel 10 is loaded into the vehicle 5 from the top of the vehicle at an angle of 45 degrees or greater with respect to the vehicle centerline V, then is rotated until the proper alignment is achieved. The loading process may depend on the surface contour of the instrument panel 10. The instrument panel 10 may be installed into the vehicle 5 in an assembled or in a disassembled form. For example, in step 104, a first portion of the instrument panel 10 can include at least one of the interchangeable modules 19a, 19b and center section 13 and may be installed first from the top of the vehicle 5. FIG. 4C schematically illustrates installing a first portion of the instrument panel 10 from the top of the vehicle 5 by lowering it into the vehicle 5. In step 106, a second portion of the instrument panel 10 including another of the interchangeable modules 19a, 19b and center section 13 may then be installed into the vehicle 5 and the first installed portion of the instrument panel 10. Other portions, such as but not limited to kick panels, may be installed from the bottom of the vehicle 5. FIG. 4D schematically illustrates installing the second portion of the instrument panel 10 from the bottom of the vehicle 5 by raising it into the vehicle 5. In this example, the second portion is a module 19b.

The instrument panel 10 may include one or more mounting flanges 36 which mate with the one or more mating flanges 31. In the example of FIG. 4, one mounting flange 36 and one mating flange 31 are shown, however, additional mounting flanges 36 or mating flanges 31 can be used. In one example, the one or more mounting flanges 36 are molded into the instrument panel 10 on a back side of the instrument panel 10, while the module-receiving areas 18a, 18b are located on a front side of the instrument panel 10.

FIG. 5 shows an example group of modules 19a, 119a, 219b that can be installed in the module-receiving portion 18a in section 12. The modular-receiving portion 18a is universal and can receive any of the group of modules 19a, 119a, 219a. In one example, more than one of the first group of modules 19a, 119a, 219a can be installed in the module-receiving portion 18a. In another example, the section 12 includes multiple module-receiving portions 18a which can each receive one of the first group of modules 19a, 119a, 219a. A second group of modules 19b, 119b, 219b may be configured to be received in the section 14 and a third group of modules 26c, 26b, 26c may be configured to be received in the center section 13. Modules in a group of modules are interchangeable with one another. In one example, the first group of modules includes a storage bin 119a and a fuse door 219a.

FIG. 6 shows a close-up view of a module 19a installed in the instrument panel 10. Both the instrument panel 10 and the module 19a include a topper pad or applique 21. The module 19a may optionally include an additional wrap covering 42, which may be made of vinyl. A gap 44 between the instrument panel 10 and the module 19a accommodates the optional wrap covering 42. A corner 43 of the module 19a may extend over the instrument panel 10 to hide the seam between the module 19a and the instrument panel 10 from a vehicle occupant's perspective. At least one fastener, such as a clip 46 secures the module 19a to the instrument panel 10. In one example, the clip 46 is metallic. While only module 19a is pictured in FIG. 6, module 19b may include the same features as described above.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. An instrument panel, comprising:
   a first group of modules;
   a left section;
   a right section, wherein the left and right sections each include at least one module-receiving area configured to interchangeably receive each of the modules in the first group of modules, and wherein the instrument panel is symmetrical about a centerline between the left and right sections;
   at least one vent in each of the left and right sections operatively connected to a heating, ventilation, and air conditioning system; and
   wherein there is a gap between at least one of the left and right sections and a module of the first group of modules when the module is in an installed position.

* * * * *